US008515595B2

(12) United States Patent
Jones

(10) Patent No.: US 8,515,595 B2
(45) Date of Patent: Aug. 20, 2013

(54) SHADOW SHAPING TO IMAGE PLANETARY OR LUNAR SURFACES

(75) Inventor: David K. Jones, West Valley City, UT (US)

(73) Assignee: Moon Publicity Corporation, West Valley City, UT (US)

(*) Notice: Subject to any disclaimer, the term of this patent is extended or adjusted under 35 U.S.C. 154(b) by 1 day.

(21) Appl. No.: 13/147,160

(22) PCT Filed: Jan. 20, 2010

(86) PCT No.: PCT/US2010/021451
§ 371 (c)(1), (2), (4) Date: Jul. 29, 2011

(87) PCT Pub. No.: WO2010/090823
PCT Pub. Date: Aug. 12, 2010

(65) Prior Publication Data
US 2011/0320069 A1 Dec. 29, 2011

Related U.S. Application Data

(60) Provisional application No. 61/150,054, filed on Feb. 5, 2009.

(51) Int. Cl.
*G05D 1/00* (2006.01)

(52) U.S. Cl.
USPC .......... 701/2

(58) Field of Classification Search
USPC .......... 701/2
See application file for complete search history.

(56) References Cited

U.S. PATENT DOCUMENTS 3,726,019 A * 4/1973 Adler .......... 33/18.1
4,714,140 A 12/1987 Hatton et al.
4,777,785 A * 10/1988 Rafaels .......... 56/10.2 A
5,323,867 A 6/1994 Griffin et al.
5,897,156 A 4/1999 Hayard et al.
6,116,545 A 9/2000 Salvatore et al.
6,267,196 B1 7/2001 Wilcox et al.
6,343,938 B1 2/2002 Moreland
2010/0299016 A1* 11/2010 Benzler et al. .......... 701/26

FOREIGN PATENT DOCUMENTS

JP 09-142347 6/1997

OTHER PUBLICATIONS

International Search Report and Written Opinion from corresponding International Application No. PCT/US2010/021451, dated Aug. 9, 2010 (7 pages).

* cited by examiner

*Primary Examiner* — James P Trammell
*Assistant Examiner* — Michael D Lang
(74) *Attorney, Agent, or Firm* — Nathan O. Greene; Brinks Hofer Gilson & Lione

(57) ABSTRACT

A method is disclosed for forming a shadow pattern on a planetary or lunar surface, including providing a rough terrain vehicle having a plurality of wheels capable of imparting to the planetary or lunar surface shadow shaping components to produce a shadow pattern capable of being seen from a distance; and controlling the rough terrain vehicle to produce a pre-designed pattern in the planetary or lunar surface, viewable from a distance when sunlight hits the shadow shaping components from an angle.

21 Claims, 6 Drawing Sheets

SHADOW SHAPING TO IMAGE PLANETARY OR LUNAR SURFACES

TECHNICAL FIELD

This application is a 371 national phase of PCT/US2010/21451, filed Jan. 20, 2010, and claims the benefit under 35 U.S.C. §119(e) of priority to U.S. Provisional Application No. 61/150,054, filed Feb. 5, 2009, the disclosures of which are herein incorporated by reference in their entireties.

BACKGROUND

Advertising has already begun on the surface of the Earth to provide views of advertising content from, for instance, airplanes as they take off and land. While providing such advertising on a macro sized scale presents some challenges, on the Earth, the techniques may be similar to print, except on a larger scale. For instance, advertising on billboards has occurred for a long time. It presents special challenges, however, to place advertising on the distant surface of the Moon, to the scale required to be seen from Earth.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

DETAILED DESCRIPTION

In the following description, the disclosed apparatuses and methods can be practiced with other methods, components, materials, etc., or can be practiced without one or more of the specific details. In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations. The order of the steps or actions of the methods described in connection with the disclosed embodiments may be changed as would be apparent to those skilled in the art. Thus, any order appearing in the Figures, such as in flow charts or in the Detailed Description is for illustrative purposes only and is not meant to imply a required order.

Figure 1A:
FIGS. 1A and 1B display, respectively, the near and far sides of the Moon.
Figure 1B:
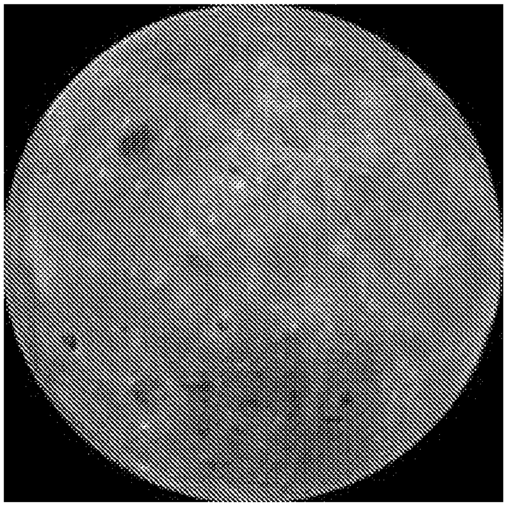

FIGS. 1A and 1B display, respectively, the near and far sides of the Moon. http://en.wikipedia.org/wiki/Moon. The Moon is in synchronous rotation, meaning that it keeps nearly the same face turned towards the Earth at all times. This fact helps make advertising on the Moon realistic. Early in the Moon's history, its rotation slowed and became locked in this configuration as a result of frictional effects associated with tidal deformations caused by the Earth.

Long ago when the Moon spun much faster, its tidal bulge preceded the Earth-Moon line because the non-fluid crust could not rapidly adjust to keep this bulge in a direct line facing Earth. The Moon's rotation swept the bulge beyond the Earth-Moon line. The pull of gravity on the out-of-line bulge caused a torque, slowing the Moon spin, like a wrench tightening a nut. When the Moon's spin slowed enough to match its orbital rate, then the bulge always faced Earth (the bulge was in line with Earth), and the torque disappeared. That is why the Moon rotates at the same rate as it orbits and we always see the same side of the Moon. Small variations (libration) in the angle from which the Moon is seen allow about 59% of its surface to be seen from the earth (but only half at any instant).

The side of the Moon that faces Earth is called the near side (FIG. 1A), and the opposite side the far side (FIG. 1B). The far side is often inaccurately called the "dark side," but in fact, it is illuminated exactly as often as the near side: once per lunar day, during the new moon phase we observe on Earth when the near side is dark. The topography of the Moon has been measured by the methods of laser altimetry and stereo image analysis, most recently from data obtained during the Clementine mission. This information could be used in the selection of flatter areas that may be better candidates for shadow shaping.

The features of the Moon therefore make advertising on its surface realistic. For instance, the near side of the Moon always faces the Earth, and has relatively flat areas, which would provide good locations to texture the surface according to the embodiments disclosed herein to create Moon-based advertising. The Earth may also be used in a similar manner to shape its surface for the purpose of advertising.

Figure 2:
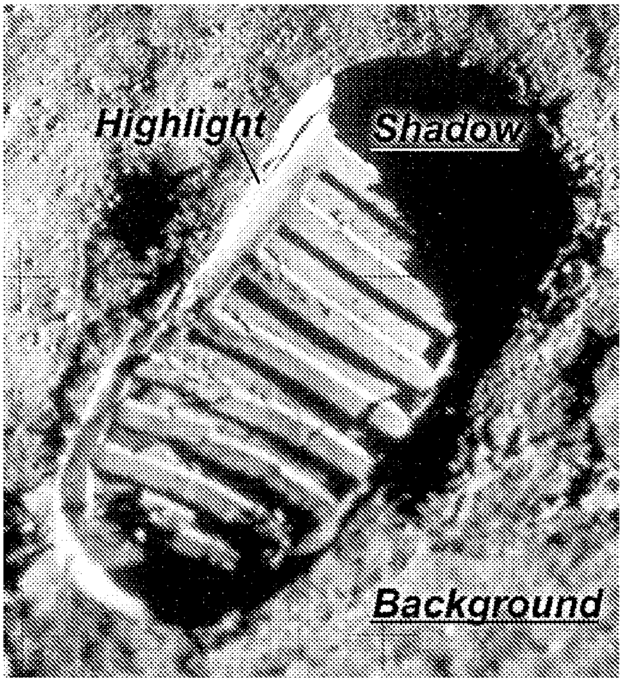
FIG. 2 is a picture of the first step of man on the Moon.

FIG. 2 is a picture of the first step of man on the Moon. The Moon is covered with dust, as fine as flour, formed by micrometeorite impacts, which pulverized local rocks into fine particles. This dust is ideal for creating shadow patterns since it can be easily compacted and shaped without the need for much depth. FIG. 2 is an excellent example of how much contrast can be generated by shadows. The lack of an atmosphere on the moon protects any patterns created from erosion, making them permanent unless the patterns are reshaped later by a shadow shaping vehicle.

Figure 3:
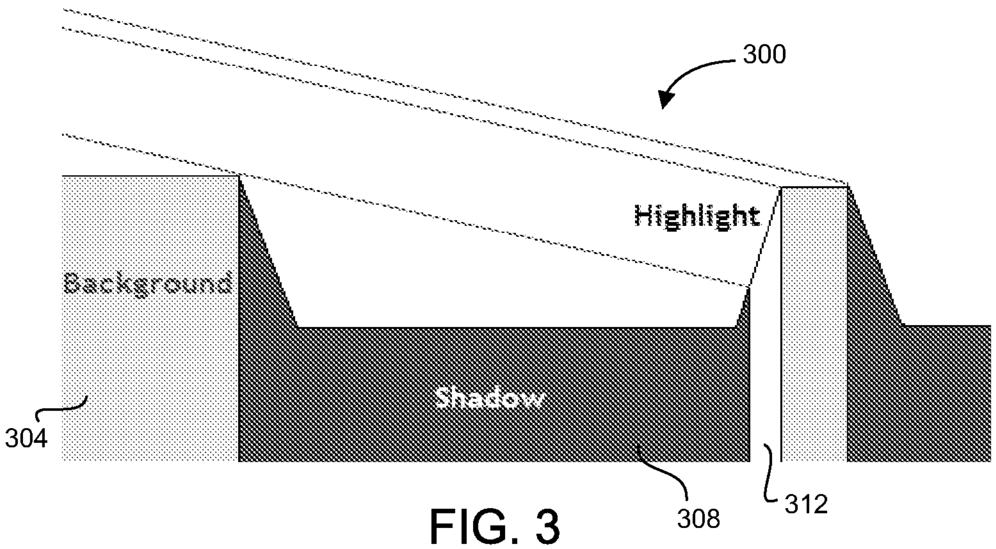
FIG. 3 is a diagram of a shadow pattern formable within the topographical surface of the moon that may provide light-blocking texture, including shadow shaping components.

FIG. 3 is a diagram of a shadow pattern 300 formable within the topographical surface of the Moon that may provide light-blocking texture, including shadow shaping components. The components include, but are not limited to, a background 304, a shadow 308, and a highlight 312. As light hits the shadow pattern 308 at an angle, a shadow 308 is created that is significantly darker than the background 304. At the end of the shadow 308, there is a portion of the pattern

300 that receives sunlight at a more direct angle and actually becomes lighter than the background 304. By making the slope of the highlight 312 steep, the relative highlighted area as seen from above is minimal compared with the larger shadow 308 area. The average of the two areas—the shadow 308 and the highlight 312—produces a net result that is significantly darker than the background.

As demonstrated in FIGS. 2 and 3, the pattern need not be very deep to create the desired effect. Spacing between the raised areas of the pattern 300 needs to correspond to the end of the shadow 308 for the darkest result. If the ratio of height to spacing for this pattern 300 is constant, the effect will be the same whether the pattern is 1 cm deep or 1 meter deep. Larger ratios will prolong the time that the pattern is visible during the cycle of the Moon to a point by minimizing the highlight 312 at more direct sunlight angles. Symmetrical patterns will provide the same effect for waxing and waning lunar cycles. Note that when the Moon is full, there will be no image since the sunlight will no longer be hitting the pattern 300 at an angle.

Figure 4:
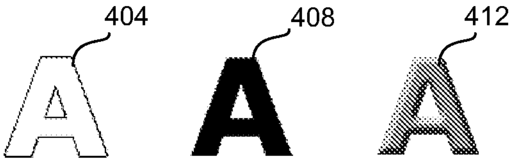
FIG. 4 is a diagram displaying image formats.

FIG. 4 is a diagram displaying image formats. Different image formats can be created such as outline 404 (faster to create), solid 408 (easier to see) or grayscale 412. Grayscale 412 is more detailed as it is created by interleaving shadow 308 and background 304 at different intervals.

Practical applications for this technology include advertising, branding, memorials, art, boundaries, navigational aids and survey markers. While the Moon appears to be the most practical immediate application for shadow shaping technology, it is not limited to the Moon. It could be used on Earth (images under high air traffic paths for example) or on the surface of other celestial bodies.

Figure 5:
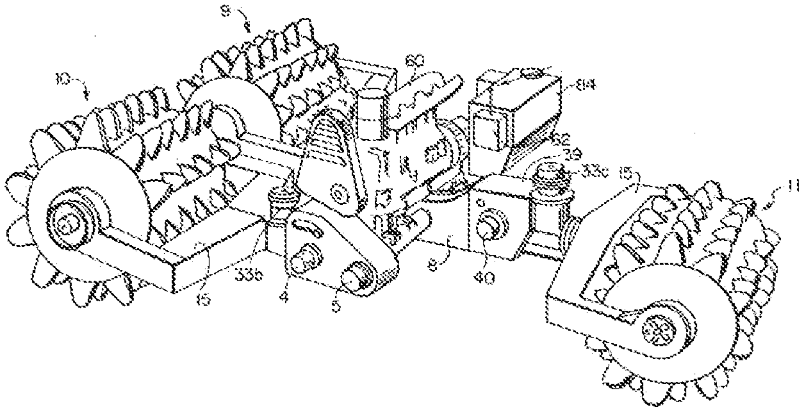
FIG. 5 is a perspective view of an exemplary rough terrain vehicle to form, on a large scale, the light-blocking texture shown in FIG. 3.

FIG. 5 is a perspective view of an exemplary rough terrain vehicle to form, on a large scale, the shadow shaping components shown in FIG. 3. To create these patterns 300 in the Moon dust, a remote controlled or autonomous, programmable rough terrain vehicle can be used. Technology to provide autonomy and resistance to extreme temperature has been demonstrated by the Mars rovers that have run reliably for several years. Since landing on opposite sides of Mars during January of 2004, Spirit and Opportunity have made important discoveries about historically wet and violent environments on ancient Mars. They also have returned a quarter-million images, driven more than 21 kilometers (13 miles), climbed a mountain, descended into craters, struggled with sand traps and aging hardware, survived dust storms, and relayed more than 36 gigabytes of data via NASA's Mars Odyssey orbiter. Both rovers remain operational for new exploration campaigns the team has planned. Since the patterns 300 disclosed herein have to cover large areas to be visible from Earth, a combination of higher speed and multiple vehicles may be used to create the patterns within reasonable amounts of time.

One possible vehicle could be a combination of the Mars rover (solar panels and extreme temperature resistance), and a three-wheeled, multi-axis rough terrain vehicle for speed, and pattern coverage, as shown in FIG. 5. See U.S. Pat. No. 4,714,140, entitled "Multi-Axis Articulated All Terrain Vehicle," filed Mar. 17, 1986, which is herein incorporated by reference.

Referring to FIG. 5 of the drawing, an exemplary embodiment of a motor vehicle 1 is illustrated. The vehicle 1 may be operated remotely by a designated operator. The vehicle 1 is designed to climb, descend and traverse slopes of up to a one-to-one gradient, remaining stable with no tendency of the drive wheel slipping or the vehicle tipping when in the traverse mode. Modifications may be made to the vehicle to enable traverse of steeper or different gradients such as is capable of the Mars rovers.

The vehicle 1 includes a main frame 3 having a generally rectangular configuration, with a pair of parallel transverse frame members 4 and 5 connected at the side ends by box beam members 6 and 7. A central beam member 8 extends along the longitudinal axis of the frame toward the rear and terminates at the rear end of the vehicle for the mounting of a wheel assembly, as will be explained. The frame has a front end to which is mounted a pair of front wheel assemblies, designated generally by the numerals 9 and 10, that are substantially identical in configuration. The frame includes a rear end at the terminus of beam 8 on which it is mounted a rear wheel assembly 11 having a single rear wheel.

The wheel assemblies 9, 10, and 11 of the vehicle may be identical in structure and a single one will be described in detail with the same reference numeral applying to the same or identical parts. The wheel assemblies of the vehicle comprises identical wheels 12, which in the illustrated embodiment are in the general form of cylindrical drums having a plurality of radial teeth or lugs 19. The wheels are each rotatably mounted in a yoke comprising parallel arms 13 and 14 extending forward of a yoke cross member 15. The wheels 12 are rotatably mounted in suitable bearings or journals 16 on the inboard side of the yoke and are journaled by a drive assembly including a hydraulic motor 17 and planetary gear drive assembly 18 on the outboard side thereof. The wheels 12 preferably have an axial length that exceeds the diameter thereof, and while radially extending lugs are illustrated, the wheels may have rubber tires for certain applications. The wheels may also be made with varying patterns to vary the type of shadow shaping components imparted to the surface of a planet.

The wheel assemblies are each mounted for steering and for swiveling to a limited extent about a longitudinal axis. Each wheel assembly is mounted for turning about a vertical axis and includes a steering motor 33. Steering motors 33_a_ and 33_b_ control steering of the front wheels, and motor 33_c_ controls steering of the rear wheel. The motors are coordinated and synchronized in an automated fashion, for instance, to help form the shadow pattern 300.

Figure 6:
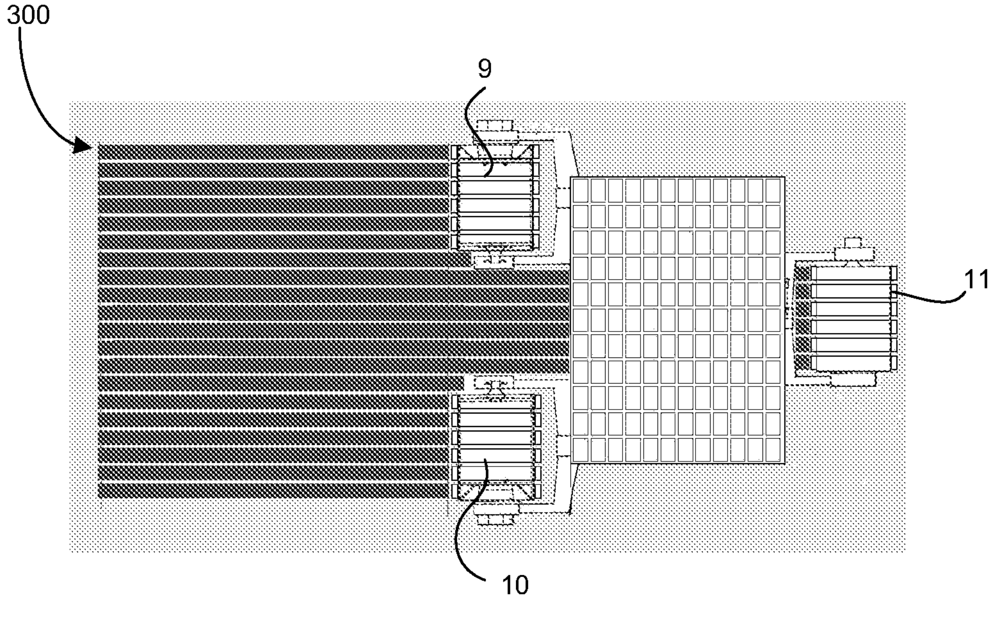
FIG. 6 is a plane view of the rough terrain vehicle of FIG. 5, displaying one kind of pattern that may be formed therefrom on the Moon surface.
Figure 7:
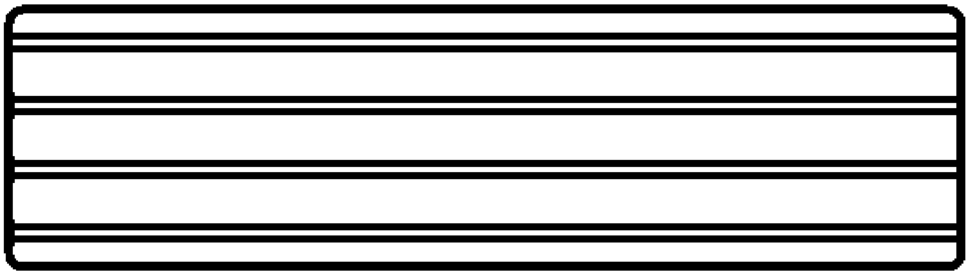
FIG. 7 displays a crosswise void tread pattern.
Figure 8:
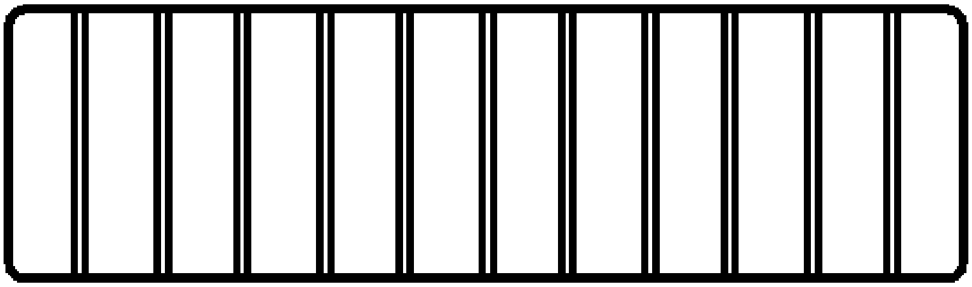
FIG. 8 displays a longwise void tread pattern.
Figure 9:
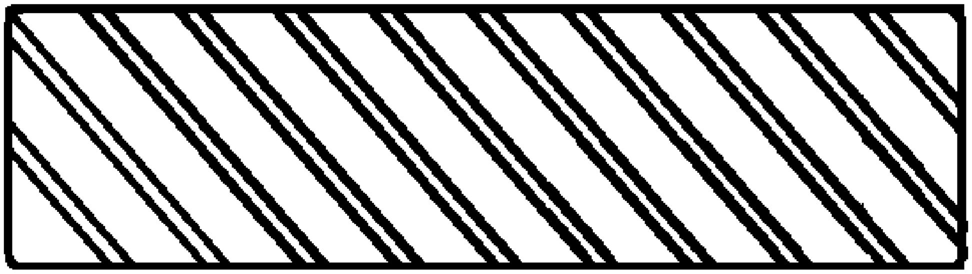
FIG. 9 displays an angled void tread pattern.

FIG. 6 is a plane view of the rough terrain vehicle 1 of FIG. 5, displaying one kind of pattern 300 that may be formed therefrom on a planet surface, such as the Moon or on the Earth. The pattern 300 is made with the tread of the wheels 9, 10, and 11. If the raised area in the shadow pattern 300 is created by a crosswise void (FIG. 7) in the tread pattern 300, then the vehicle 1 will need to travel laterally. If the raised area in the shadow pattern is created by a longwise void (FIG. 8) in the tread pattern, then the vehicle 1 will need to travel longitudinally. Angled voids (FIG. 9) could also be created for traction, but whatever the tread pattern 300, the raised area must be created perpendicular to the angle of the sun during partial phases of the Moon. Three wheels allows for full coverage of the travel path, where a four-wheeled design may leave a gap in the middle. If extra weight is needed to provide sufficient dust compression, dust, rocks and soil could be collected in an onboard reservoir.

Figure 10:
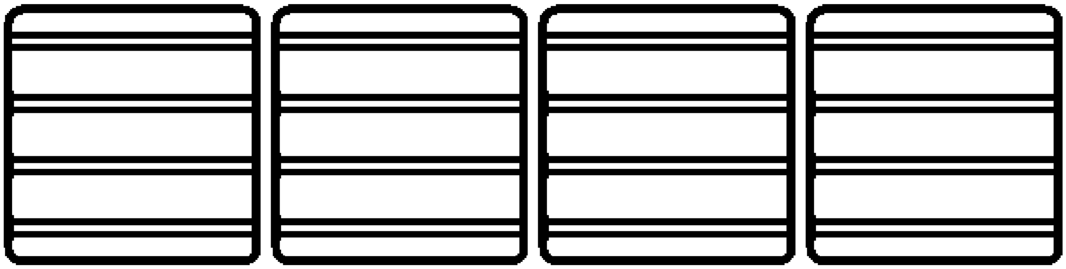
FIG. 10 displays a series of wheels to create similar patterns to those of FIGS. 6-9, but intermittently across multiple wheels.

FIG. 10 displays a series of wheels to create similar patterns 300 to those of FIGS. 6-9, but intermittently across multiple wheels. Since covering the maximum amount of surface area in a given time period is desirable, the most efficient wheel geometry will likely be elongated cylinders for wider coverage or a set of wheels arranged in an elongated cylinder. One example of a set of wheels arranged in an elongated cylinder is shown in FIG. 10. The series of wheels may provide more traction since each wheel can be individually articulated to improve contact on uneven surfaces. Each series of wheels could still be arranged in a tri-wheeled vehicle. If the geometry of the series of wheels is chosen carefully, the space between the wheels could provide the void to produce the raised portion of the shadow pattern, similar to the longwise tread void, replacing the need for any treads on the wheels at all.

If needed for traction, treads could be designed, in conjunction with the shadow shaping voids, that do not interfere with or contribute to the shadow shaping components, such as treads that extend from the wheel that would leave patterns hidden in the shadow portion 308 of the shadow shaping pattern 300 shown in FIG. 3.

Figure 11:
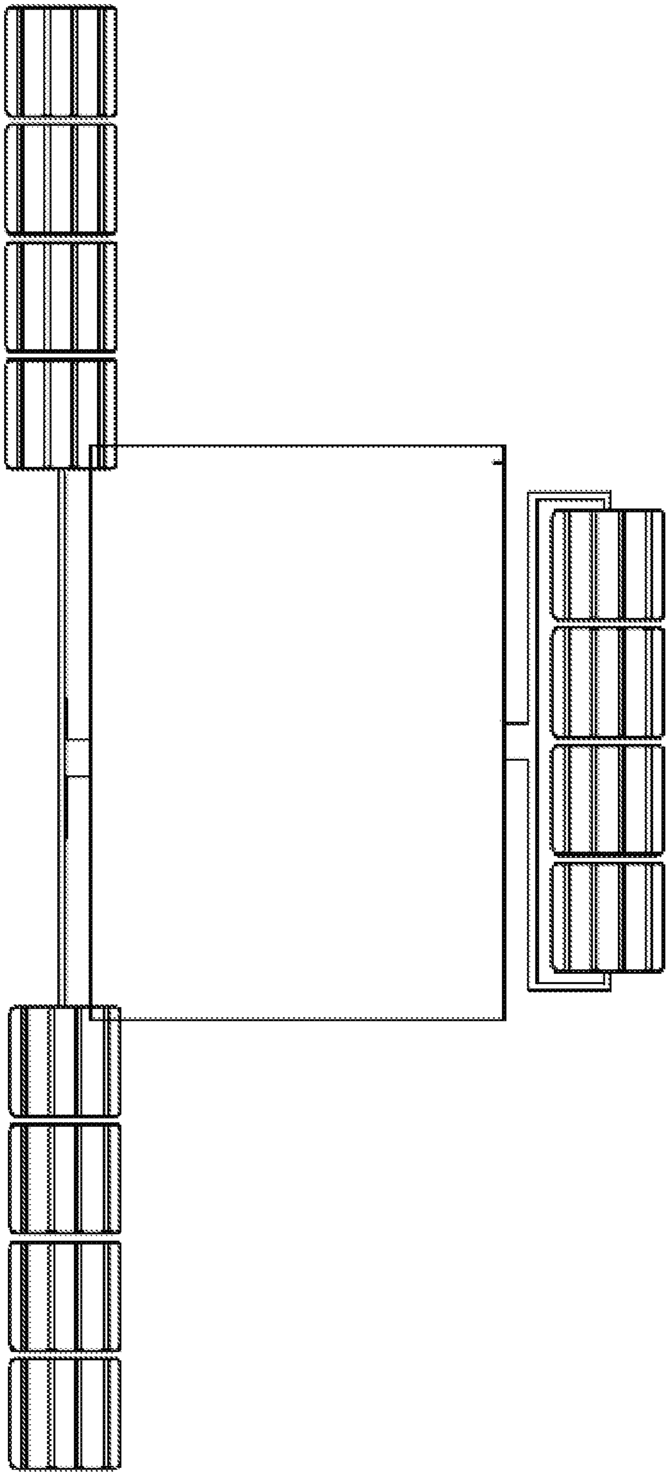
FIG. 11 displays an embodiment of the rough terrain vehicle such as FIG. 6 employing the series of wheels tread pattern of FIG. 10.

FIG. 11 displays an embodiment of the rough terrain vehicle such as FIG. 6 employing the series of wheels tread pattern of FIG. 10. The vehicle displayed in FIG. 11 includes a rough design, showing the placement of the multiple-wheel assemblies at each location of one of the three wheels of the vehicle 1 shown in FIG. 5. The vehicle of FIG. 11 includes the capability to fold itself into a smaller form for space transport and the ability to unfold itself upon arrival. Various size-to-number ratios of the vehicles would have various optimizations that could vary depending on application or image being formed. For instance, it may be more efficient to have one 2 m wide vehicle or two 1 meter wide vehicles. The most efficient wheel diameter would need to be determined from optimizing torque, speed and traction.

Figure 12:
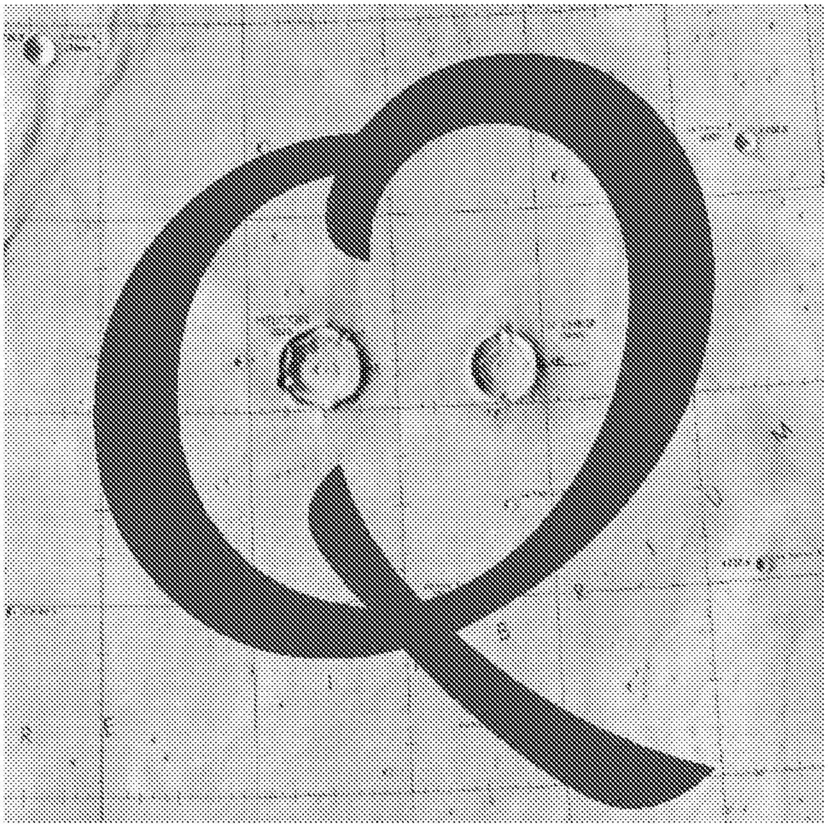
FIG. 12 displays obstacle avoidance strategies in creating light-blocking textures.

FIG. 12 displays a strategy of creating light-blocking patterns in areas with craters that may be difficult to traverse by designing and locating patterns to avoid these difficult areas. While lunar dust is ideal for creating shadow shaping patterns, it also presents challenges that will need to be managed. The dust is very abrasive so the wheel materials will need to be hard, and the voids will need to be deep, to prolong erosion of the tread patterns. The dust may also statically or mechanically cling to the voids in the tread patterns, requiring mechanical or electromagnetic techniques to keep them clear. For example, longwise tread patterns (FIG. 8), or the space between a series of wheels (FIG. 10), could be cleaned by installing brushes in front of the wheels that clean the voids as the wheels turn just before an impression is made. Cleaning strategies will also be needed to keep the dust from collecting on the solar panels.

The creation of light-blocking patterns is not limited to wheel tread patterns. Any number of approaches, or a combination of approaches, including a device that is dragged behind the vehicle, could be used to create the same patterns. Dragged approaches may not work as well for rough terrain areas, but may manage tread erosion and static cling challenges better.

Shadow shaping technologies apply to the surface of any planet or moon including the Earth. Patterns can be created in nearly any surface media exposed to the sun including, but not limited to, dirt, sand, rock, snow, ice and even vegetation. However, since the Earth has an atmosphere, any image created would erode over time. Also, depending on material properties such as coarseness, hardness and transparency, additional techniques, including the need to create deeper patterns, may be required to produce the shadow patterns, but the pattern and the effects would be the same. Periods during which the patterns produce light-blocking effects on the Earth would be shorter and more frequent due to shorter days on Earth.

The invention claimed is:

1. A method for forming a shadow pattern on a planetary or lunar surface, the method executable by at least one processor and memory, comprising:

providing a rough terrain vehicle having a plurality of wheels capable of imparting to the planetary or lunar surface shadow shaping components to produce a shadow pattern capable of being seen from a distance, wherein the plurality of wheels include a series of wheels in elongated alignment; and controlling, by the at least one processor, the rough terrain vehicle to produce a pre-designed pattern in the planetary or lunar surface, viewable from a distance when sunlight hits the shadow shaping components from an angle, wherein the pre-designed pattern comprises a plurality of angled voids.

2. The method of claim 1, wherein controlling the rough terrain vehicle comprises remotely controlling the rough terrain vehicle by controlling the at least one processor remotely.

3. The method of claim 1, wherein controlling the rough terrain vehicle comprises using programmed autonomy, wherein the rough terrain vehicle follows a pre-programmed path executable by the at least one processor.

4. The method of claim 1, wherein the plurality of wheels are interspersed to provide the greatest width of coverage of the planetary or lunar surface.

5. The method of claim 1, wherein a device is dragged behind the vehicle to create the shadow shaping components.

6. The method of claim 1, wherein the shadow shaping components comprise a large shadow area and a small highlight area within a background of the planetary surface where an overall effect is significantly darker than the background.

7. The method of claim 1, wherein the shadow shaping components comprise a surface that appears lighter than a background of the planetary surface based on receipt of more sunlight at a direct angle with respect to a viewing angle.

8. A method for forming a shadow pattern on a planetary or lunar surface, the method executable by at least one processor and memory, comprising:

providing a rough terrain vehicle having at least two wheels capable of imparting to the planetary or lunar surface shadow shaping components, including a large shadow area and a small highlight area within a background of the planetary surface that create a joint area that is significantly darker than the background and that is viewable from a distance; and controlling, with the at least one processor, the rough terrain vehicle to produce a pre-designed pattern in the planetary or lunar surface, viewable from a distance when sunlight hits the shadow shaping components from an angle, wherein the pre-designed pattern comprises a grey-scaled area of the features to be viewed from a distance.

9. The method of claim 8, wherein the at least two wheels comprises at least three wheels, two outer wheels and a wheel positioned in between and offset from the two outer wheels, and wherein the pre-designed pattern is symmetrical.

10. The method of claim 8, wherein controlling the rough terrain vehicle comprises remotely controlling the rough terrain vehicle by controlling the at least one processor with at least one computer.

11. The method of claim 8, wherein the pre-designed pattern comprises an outline of features to be viewed from a distance.

12. The method of claim 8, wherein the pre-designed pattern comprises a solid darkened area of the features to be viewed from a distance.

13. The method of claim 8, wherein the rough terrain vehicle imparts the pre-designed pattern to the planetary surface through the use of treads of the at least two wheels.

14. The method of claim 8, wherein the pre-designed pattern comprises a crosswise void created by lateral movement of the rough terrain vehicle.

15. The method of claim 8, wherein the pre-designed pattern comprises a longwise void created by lateral movement of the rough terrain vehicle.

16. The method of claim 8, wherein the at least two wheels each include a series of wheels in general elongated alignment, wherein the pre-designed pattern comprises a plurality of angled voids.

17. The method of claim 8, wherein the at least two wheels are arranged in an elongated cylinder for wider coverage across the planetary surface.

18. The method of claim 17, wherein each of at least some of the at least two wheels of the elongated cylinder are capable of individual articulation independent of each other.

19. The method of claim 8, wherein controlling the rough terrain vehicle comprises using programmed autonomy, wherein the rough terrain vehicle follows a pre-programmed path executable by the at least one processor.

20. The method of claim 8, further comprising:

cleaning planetary dust from treads of the at least two wheels with brushes installed in front of the wheels located at the front of the rough terrain vehicle.

21. A method for forming a shadow pattern on a planetary or lunar surface, the method executable by at least one processor and memory, comprising:

providing a rough terrain vehicle having at least two wheels capable of imparting to the planetary or lunar surface shadow shaping components, including a large shadow area and a small highlight area, the small highlight area appearing lighter than a background of the planetary surface based on receipt of more sunlight at a direct angle with respect to a viewing angle, wherein the at least two wheels are arranged in an elongated cylinder for wider coverage across the planetary surface; and controlling, with the at least one processor, the rough terrain vehicle to produce a pre-designed pattern in the planetary or lunar surface, viewable from a distance when sunlight hits the shadow shaping components from one or more angles.

* * * * *